April 15, 1958 M. BITZER 2,830,314
WINDSHIELD CLEANER
Filed Aug. 31, 1954 3 Sheets-Sheet 1
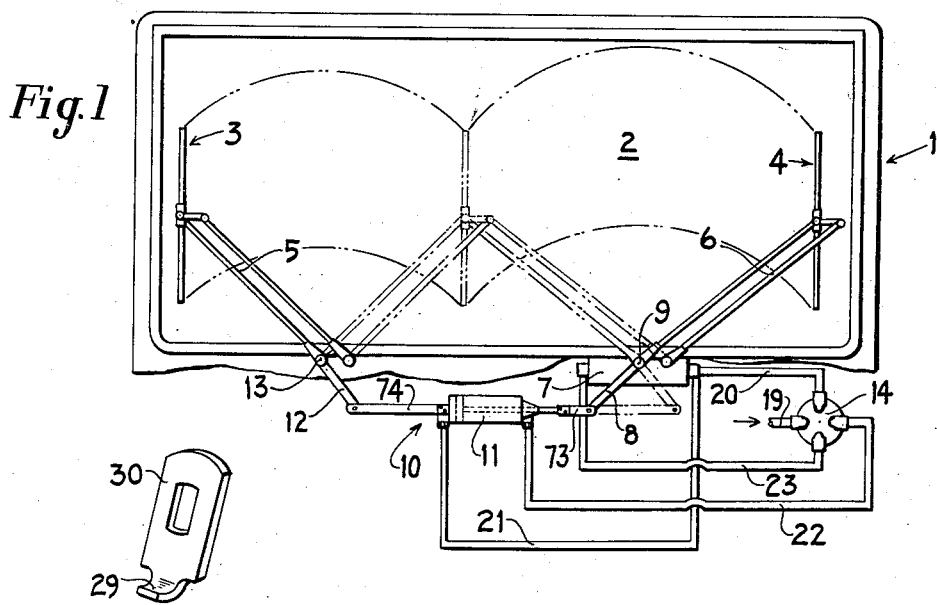
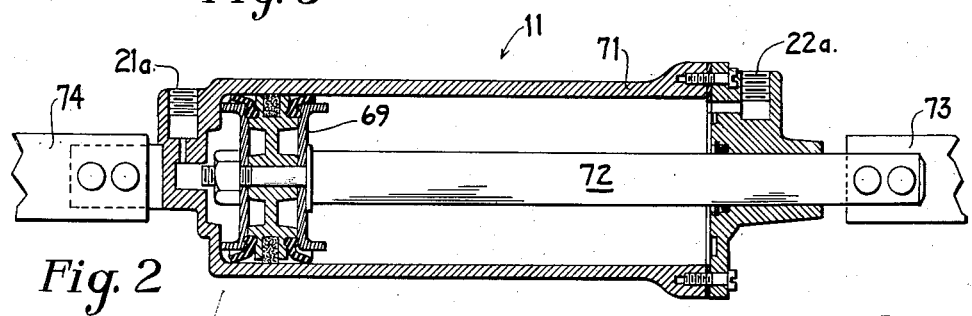
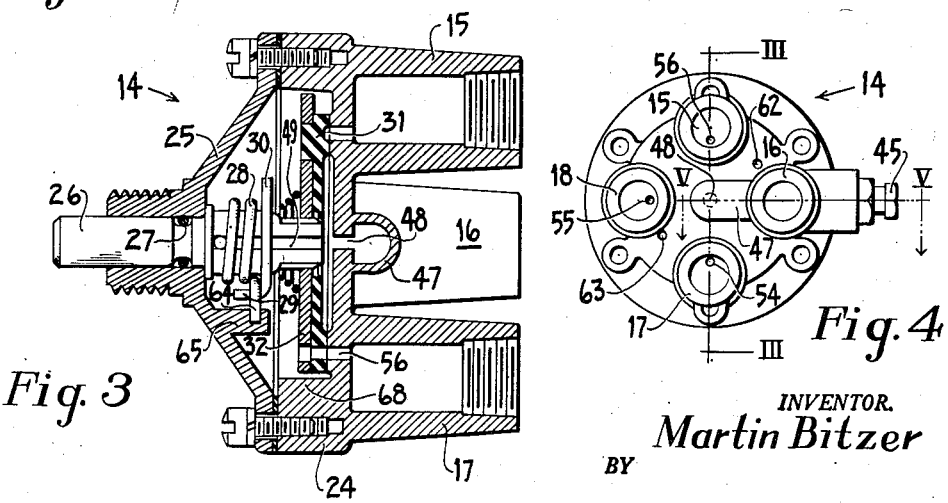
INVENTOR.
Martin Bitzer
BY
Beau, Brooks, Buckley & Beau,
ATTORNEYS.

April 15, 1958 M. BITZER 2,830,314
WINDSHIELD CLEANER
Filed Aug. 31, 1954 3 Sheets-Sheet 2
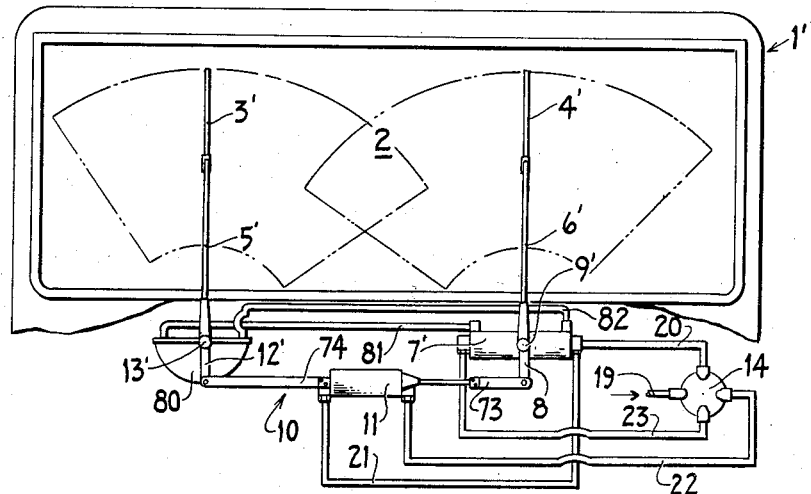
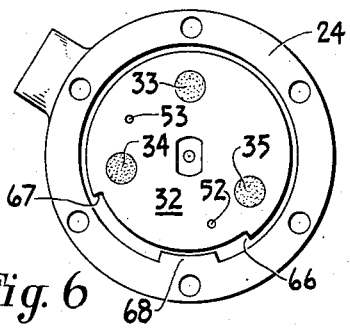
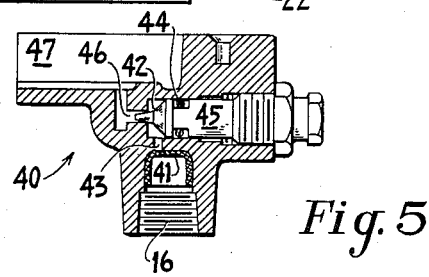
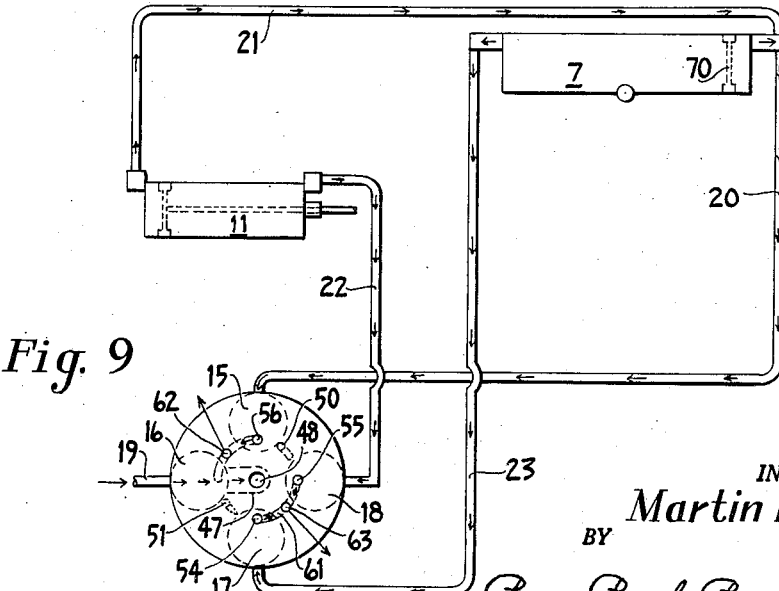
INVENTOR.
Martin Bitzer
BY
Beau, Brooke, Buckley & Beau,
ATTORNEYS.

April 15, 1958        M. BITZER        2,830,314
WINDSHIELD CLEANER
Filed Aug. 31, 1954        3 Sheets-Sheet 3
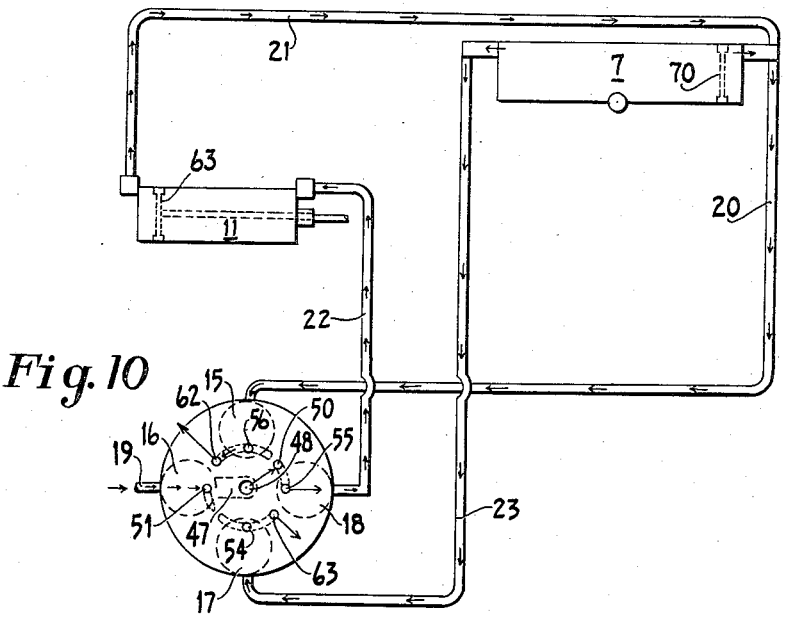
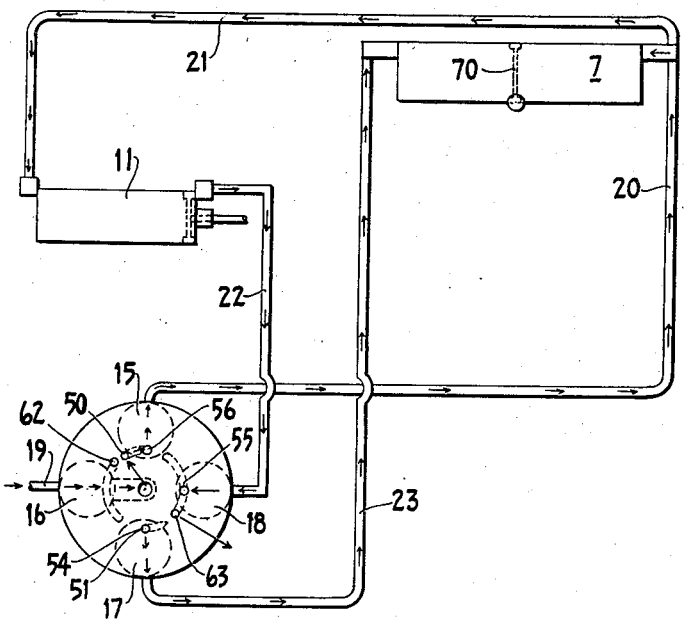
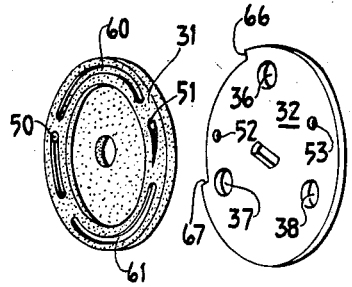
INVENTOR.
Martin Bitzer
BY
Beau, Brooks, Buckley & Beau,
ATTORNEYS.

United States Patent Office 2,830,314
Patented Apr. 15, 1958

2,830,314

WINDSHIELD CLEANER

Martin Bitzer, Kenmore, N. Y., assignor to Trico Products Corporation, Buffalo, N. Y.

Application August 31, 1954, Serial No. 453,215

16 Claims. (Cl. 15—253)

This invention relates to a windshield cleaner for automotive vehicles, and more particularly to a cleaner adapted to eliminate the blind spot existent on the central portion of windshields during heavy weather.

Heretofore, windshield cleaners have comprised two blades, one located substantially in front of the operator of the vehicle and the other substantially in front of the passenger, with both blades oscillating about pivots located proximate to the lower molding of the windshield. In some systems the blades were run in parallelism while in others they ran in opposition or clapped hands relationship. However, regardless of the relative motion between the blades, the central portion of the windshield was beyond the wiping area of either blade, and thus remained completely obliterated in heavy weather, obstructing the vision of the operator.

With the increased employment of motor vehicles and the traffic congestion resulting therefrom, the need for greater visibility is of paramount importance and has resulted in the design of vehicles with ever increasing glass area. But, in heavy weather when the need for maximum visibility is most important, the increased glass area is of no significance whatsoever if such area remains obliterated. There is therefore a distinct need for a cleaning system which is adapted to clear of precipitation substantially the entire windshield. Accordingly, it has been proposed that the squeegees be mounted so as to wipe overlapping areas. However, in order to accomplish this without having the squeegees interfere with one another it is necessary that they run in parallelism. Such relationship presents a problem when the blades are parked. If operated in parallelism at all times, one of the blades must necessarily be parked at substantially the center of the shield, a position in which it will unavoidable obstruct vision.

In accordance with the present invention, the wipers run in synchronized movement and park in out-of-phase position. In the illustrated embodiments, there is utilized a connecting rod motor, or a parking motor, with the motor cylinder and piston built into the connecting rod which transmits the movement from the wiper motor to a auxiliary wiper shaft.

The control valve for this system is arranged so that in its running position there is a differential pressure applied to the opposite sides of the piston in the connecting rod motor in the direction to push the piston out as far as built-in stops will permit it to go, thereby increasing the length. The differential pressure is held continuously in this connecting rod motor during wiper operation so that the entire mechanism functions as a solid connecting rod without relative movement of any of its parts. In this position the length of the connecting rod is such that the arms operate in parallel positions, and this condition obtains as long as the wiper is running either at full speed or any of its reduced speeds of operation. When the control valve is moved to the "off" position, differential pressure is cut off entirely from the running motor, and from both sides of the connecting rod motor, thereby arresting the mechanism in whatever position it is at the time when the valve is so moved. After this, the valve is then moved farther in the direction of the "off" position to again set up a pressure differential in the connecting rod motor, but in a reverse direction. This reversal of pressure on the piston in the connecting rod motor will now move the piston into the cylinder and shorten the connecting rod to a predetermined value that is controlled by stops in the cylinder to limit the motion of the piston. During this operation the wiper which moves the easier will first go to its parked position, and the further movement of the connecting rod piston relative to its cylinder will effect a similar movement of the other wiper unit to its parked position. This control valve position for the parking is preferably one that has to be held manually against a recovery spring, the control valve will immediately revert to its "off" position as soon as the control valve is released by the operator of the automobile, and this will relieve all parts of the system from any pressure differential, as indicated at the outset of this description. Obviously, the arrangement would work without blade interference during the running, and it should be equally obvious that this arrangement would work without blade interference during the parking. The system will start without blade interference as soon as the motor is turned on to provide a reversal of pressure on the connecting rod motor which will accelerate the motion of the blade on the passenger side to get it out of the way of the companion blade.

Accordingly, it is the primary object of the present invention to provide a windshield cleaning system which is adapted to clean the heretofore obliterated central portion of the shield as well as those areas previously cleaned, without having the blades interfere with one another in operation and yet being capable of parking substantially out of the field of vision of the operator of the vehicle.

For a greater appreciation of this and other objects of the inventon, reference is made to the following specifications and accompanying drawings wherein:

Fig. 1 is a fragmentary perspective view of an automotive vehicle equipped with a windshield cleaning system constructed in accordance with the instant invention;

Fig. 2 is a longitudinal sectional view of the pneumatic link;

Fig. 3 is a sectional view of the master control valve taken on line III—III of Fig. 4;

Fig. 4 is an end view of the rotary control valve;

Fig. 5 is a sectional view of the adjustable flow control valve taken on line V—V of Fig. 4;

Fig. 6 is an end view of the master control valve with the cover plate and shaft assembly removed;

Fig. 7 is an exploded view of the valve element and valve plate;

Fig. 8 is a perspective view of the drive lever;

Figs. 9, 10 and 11 are schematic flow diagrams illustrating the cycle of operation of the present invention; and Fig. 12 is a diagrammatic view of a modified form of the invention.

Referring now more particularly to the drawings, the numeral 1 generally designates an automotive vehicle having a windshield 2 and wipers 3 and 4. The wipers are mounted on parallelogram arms 5 and 6 of conventional design which maintain the wipers in a substantially vertical position throughout their operating arcs. Motor 7 which is of the superatmospheric type such as that disclosed in United States Letters Patent No. 2,632,196, is mounted on the firewall of the vehicle and has crank arm 8 fixedly attached to its drive shaft 9. The outer end of the crank arm is connected to a multiple element transmission 10 which includes a pneumatic link 11. The motion of the drive shaft is transmitted to wiper 3 via the transmission, crank arm 12, rockshaft 13 and parallelogram arm 5. Parallelogram arm 6 derives its motion directly from drive shaft 9.

The master control valve 14 may be located at any position within the passenger compartment convenient to the operator of the vehicle. Protruding from the rear of the valve housing are four nipples 15, 16, 17 and 18 as best seen in Figs. 3 and 4. Hose 19, shown fragmentarily in Fig. 1 interconnects nipple 16 and a source of superatmospheric pressure, not shown. Hose 20 interconnects nipple 15 with the parking cylinder of motor 7, while hose 21 T'd off hose 20, interconnects the left side of the pneumatic link with nipple 15. Hose 22 runs from nipple 18 to the right side of the pneumatic link while hose 23 interconnects nipple 17 with the left side of motor 7.

Referring now more particularly to Figs. 3 and 4, it may be seen that the master control valve comprises a circular casing 24 from which the four equally spaced nipples protrude, and a substantially conical cover plate 25. Shaft 26 having a sealing ring 27 is passed through a central opening in the cover plate. Torsion spring 28 carried on a central portion of the shaft is maintained in a prestressed condition by having one of its ends anchored in a slot 49 provided therefor in the shaft, and having its opposite end abutting tongue 29 of drive lever 30. The lever is maintained in driving engagement with the shaft by means of flats on the latter engaging a substantially rectangular aperture in the lever. As a result, spring 28 is normally maintained in its prestressed condition regardless of the manner in which the shaft may be rotated since the lever will at all times rotate with the shaft.

Valve element 31 which may be composed of rubber or some similar material is maintained in driving engagement with valve plate 32 by means of a plurality of bosses 33, 34 and 35 on the element engaging mating holes 36, 37 and 38 on the plate. Conical spring 39 carried on the extreme end of the shaft 26 insures close contact between the element and plate and also between the element and the face of casing 24.

The flow of air into the system is controlled by means of valve 40 best seen in Fig. 5. Air flowing from the source enters nipple 16, passes filter screen 41 and enters flow chamber 42 through orifice 43. Sealing ring 44 prevents the leakage of air past needle valve 45, while the conical tip of the needle valve in conjunction with orifice 46 controls the rate at which the air will flow into passageway 47. From passageway 47 the air flows through orifice 48 and via slot 49 in shaft 26 into the dome formed by the conical cover plate. Sealing ring 27 prevents the air from flowing out past the shaft, and it enters the desired nipple or nipples via mating holes 50, 51, 52 and 53 of the plate 32 and element 31. Which, if any, of the nipples the air will enter is determined by whether or not the holes in the plate and element are in registration with holes 54, 55 and 56 of nipples 15, 17 and 18 respectively.

Referring now more particularly to Figs. 9, 10 and 11, when the master control is turned to the position indicated in Fig. 9, the entire system is neutralized, air flowing into the master control enters the dome as described above. However, since neither orifice 50 nor orifice 51 of the valve element 31 is in registration with any of orifices 54, 55 and 56, the high pressure air cannot enter the system. Pressure builds up in the dome until a point is reached where the air ceases to flow. Air in the left side of pneumatic link 11 flows out through hose 21 to hose 20 where it is joined by air flowing out of the right side of motor 7. Hose 20 empties into nipple 15, orifice 56 of which is in register with groove 60 of the valve element 31. The air then passes to the atmosphere via orifice 62 of the valve casing 15. Air from the left side of motor 7 passes out through hose 23 and enters orifice 54 of nipple 17. From orifice 54 the air flows along groove 61 and empties into the atmosphere via orifice 63 drilled in the casing 15. Similarly, air from the right side of pneumatic link 11 flows to the atmosphere via hose 22, orifice 55 of nipple 18, groove 61 and orifice 63. It may therefore be seen that when the master control is turned to the "off" position all pressure in the system is neutralized causing the various elements to come to a halt in whatever position they happen to be at the instant of neutralization. Additionally, the inturned end 64 of torsion spring 28 is brought into substantial engagement with abutment 65 of casing 25 when the shaft 26 is rotated to bring the valve to the "off" position.

Further rotation increases the strain on torsion spring 28 since its inturned end 64 is prevented from rotating with the remainder of the spring because of engagement with abutment 65. If such rotation is continued until shoulder 66 of valve plate 32 strikes abutment 68 of casing 15, the master control is placed in the "park" position illustrated in Fig. 10. High pressure air from hose 19 enters the dome in the usual manner via nipple 16, passageway 47 and orifice 48. From the dome the air passes through orifice 50 and its associated groove in element 31 and into hose 22 via orifice 55 in nipple 18. From hose 22 the air enters the right side of pneumatic link 11 so as to urge piston 69 to the left. Concurrently, air leaves the left side of the pneumatic link via hose 21 and joins the air leaving the right side of motor 7 at hose 20. The air in hose 20 evacuates to the atmosphere via orifice 56 in nipple 15, groove 60 in the valve element and orifice 62 in the casing. Similarly, the air from the left side of the motor is evacuated via hose 23 so as to neutralize any pressure differential which might exist across piston 70 of the drive motor. The air in hose 23 flows to orifice 54 of nipple 17 and then to the atmosphere via groove 61 and orifice 63. It should be remembered that when shaft 26 is rotated to place the master control in the "park" position, spring 28 is stressed by the engagement of inturned end 64 with abutment 65. It is therefore necessary to manually hold the valve in the "park" position until squeegees 3 and 4 reach the position indicated in solid in Fig. 1. When the shaft is released it automatically returns to the "off" position of Fig. 9. With the master control in this position the high pressure air is evacuated to the atmosphere as described above and the entire system is neutralized.

Referring now more particularly to Figs. 1 and 2, the pneumatic link comprises a cylindrical casing 71 enclosing the piston 69. Hoses 21 and 22 are coupled to pressure fittings 21a and 22a respectively. Piston rod 72 is rigidly affixed to the piston and extends out of the cylinder where it is attached to connecting rod 73, the opposite end of which is pin connected to crank arm 8. Connecting rod 74 is connecting to crank arm 12 at one end and to the pneumatic link at its opposite end.

With the master control in the "off" position and the system neutralized, no pressure differential exists across either piston 69 of the pneumatic link or piston 70 of the motor. Rotation of the master control to the "park" position of Fig. 10 causes high pressure air to flow into the right side of the pneumatic link and move piston 69 to the left so as to contract the transmission 10. Such contraction compels the system to assume the parked position indicated in solid in Fig. 1. After the blades are parked, the operator releases the master control which will under the urging of spring 28 return to the "off" position of Fig. 9 so as to release the pressure on the right side of piston 69. The system will, due to inertia and friction, remain in the parked position until activated.

When it is desired to activate the system, the master control is turned to the "run" position of Fig. 11. In this position, shoulder 67 of valve plate 32 is adjacent to abutment 68 of casing 15. The abutment acts as a positive stop to prevent the inadvertent rotation of the valve element beyond the "run" position. Air enters the dome in the usual manner and flows into hose 23 via orifices 51 and 54 which are in registration with each other.

From hose 23 the high pressure air enters motor 7 and causes piston 70 to reciprocate in a manner fully described in the above identified Patent 2,632,196. Simultaneously air enters hose 20 via orifices 50 and 56 and the intervening groove in the valve element. From hose 20 the air flows into the parking cylinder of the motor and also into the left side of the pneumatic link via hose 21. The high pressure air forces piston 69 to the right so as to expand transmission 10 as shown in phantom in Fig. 1. With the transmission expanded the wipers will operate in phase i. e. they will both move to the right and then to the left at the same time. The operating arcs are so designed that the extreme rightward travel of squeegee 3 overlaps the extreme leftward travel of squeegee 4 so as to eliminate the heretofore existent blind spot at the center of the shield. In addition it should be noted that the transmission is maintained "solid" in its expanded position by the application of pressure to the left side of piston 69 for so long as the master control is in the "run" position. When it is desired to deactivate the system the master control is rotated through "off" to "park" so as to contract the transmission and then automatically returned to "off" by the torsion spring to relieve the pressure as described above.

Thus, when the system is actuated, the transmission parts 74, 11 and 73 function in the manner of a solid connecting rod transmitting driving force from crank arm 8 to crank arm 12, and there is no relative movement between casing 71 and piston 69 of the expansible pneumatic link 11. Link 11 therefore is mounted to reciprocate as part of the transmission, and conduits 21 and 22 are sufficiently flexible to follow the moving link 11.

Referring now more particularly to Fig. 12 wherein a modified form of the invention is shown. Herein a pneumatic motor 7' which may be of either the superatmospheric or vacuum type is employed in conjunction with a dummy motor 80. The dummy motor contains no valving, and the two sides of its pressure chamber are connected to the corresponding sides of motor 7' by conduits 81 and 82. This insures the duplication in motor 80 of the pressure conditions existent in motor 7'. The squeegees 3' and 4' are of conventional design and are mounted on oscillatable arms 5' and 6' which drivingly engage shafts 13' and 14' of the motors 7' and 80. Because of the identity of pressure conditions within the two motors, the wipers will normally oscillate in phase with one another. The master control and pneumatic system will operate in a manner substantially identical to that disclosed above relative to the species of Fig. 1. The system will be neutralized when the control is in the "off" position, the transmission will contract so as to park the blades out of phase when the control is turned to the "park" position and the transmission will expand so as to compel the wipers to operate in phase when the control is turned to the "run" position, all as described above.

In this parking action, the motor that moves the easier of the two will respond first to the pressure, and as soon as it reaches its parking position, the further contraction in the transmission will now compel the other motor unit to move to its parking position, thereby bringing both blades to their fully parked positions at the completion of the contraction in the transmission. From this and a similar action that takes place in the system with one motor when the simultaneous control for motor and expanding or contracting transmission is operated, it will be observed that this expansible and contractible element in the transmission actually becomes another motor during the first movements when the wiper is turned on and again during the parking when the system is deactivated. Therefore, the transmission constitutes a connecting rod motor or parking motor for extending and contracting the pneumatic link that joins the wipers.

When used as above indicated it will be noted that the contractible and expansible transmission element will be working between a single blade unit and a two blade unit, therefore, it is obvious that in the parking operation the single blade unit will move first thereby bringing this one blade out of parallel synchronism into its opposite position ahead of the parking movement that is subsequently given to the two blade unit. Thus it will be seen that the blade that lays down into contact with the cowl of the windshield will get there first without interference from the other blade which will subsequently come down on top of it.

It may therefore be seen that by employing the present invention it is possible to eliminate blind spots on the windshield by operating the blades in phase so that their wiping arcs overlap without any possibility of blade interference. Additionally, and by the simple rotation of a control valve the blades are thrown out of phase to permit parking out of the line of vision.

Having thus disclosed exemplary embodiments thereof, what I claim as my invention is:

1. A windshield cleaning system for automotive vehicles comprising, a plurality of blades adapted to clear an associated windshield of moisture, motive means for driving said blades to and fro across the windshield, a transmission including an expansible link operatively connected to said blades and operable to hold said blades for operating in phase or to park said blades out of phase, and means for controlling the contracting and expanding of said link.

2. A windshield cleaning system for automotive vehicles comprising, a plurality of blades adapted to clear an associated windshield of moisture, motive means for driving said blades to and fro across the windshield, an expansible and contractible pneumatic link operatively connecting said blades, the phase relationship of said blades being determined by whether or not said link is being maintained in an expanded or contracted condition, a pneumatic system for expanding and contracting said link, and means for controlling the pneumatic system.

3. A windshield cleaning system for automotive vehicles comprising, a plurality of blades adapted to clear an associated windshield of moisture, motive means for driving said blades to and fro across the windshield, the inboard ends of the operating strokes of said blades overlapping one another, an expansible link operatively connected to said blades, the phase relationship of said blades being determined by whether or not said link is being maintained in an expanded or contracted condition, and means for controlling the contracting and expanding of said link.

4. A windshield cleaning system for automotive vehicles comprising, a plurality of blades adapted to clear an associated windshield of moisture, motive means for driving said blades to and fro across the windshield, the inboard ends of the operating strokes of said blades overlapping one another, a transmission including an expansible pneumatic link operatively connected to said blades, the phase relationship of said blades being determined by whether or not said link is being maintained in an expanded or contracted condition, a pneumatic system for expanding and contracting said link, and means for cotrolling the pneumatic system.

5. A windshield cleaning system for automotive vehicles comprising, a plurality of blades adapted to clear an associated windshield of moisture, motive means for driving said blades to and fro across the windshield, a transmission including an expansible link operatively connected to said blades, the phase relationship of said blades being determined by whether or not said link is being maintained in an expanded or contracted condition, and control means, said last named means being adapted to simultaneously control the activation and deactivation of the motive means as well as the expansion and contraction of the expansible link.

6. A windshield cleaning system for automotive vehicles comprising, a plurality of blades adapted to clear an associated windshield of moisture, motive means for driving said blades to and fro across the windshield, a transmission including an expansible pneumatic link operatively connected to said blades, the phase relationship of said blades being determined by whether or not said link is being maintained in an expanded or contracted condition, a pneumatic system for expanding and contracting said link, and control means, said last named means being adapted to simultaneously control the activation and deactivation of the motive means as well as the expansion and contraction of the expansible link.

7. A windshield cleaning system for automotive vehicles comprising, a plurality of blades adapted to clear an associated windshield of moisture, motive means for driving said blades to and fro across the windshield, the inboard ends of the operating strokes of said blades overlapping one another, a transmission including an expansible link operatively connected to said blades, the phase relationship of said blades being determined by whether or not said link is being maintained in an expanded or contracted condition, and control means, said last named means being adapted to simultaneously control the activation and deactivation of the motive means as well as the expansion and contraction of the expansible link.

8. A windshield cleaning system for automotive vehicles comprising, a plurality of blades adapted to clear an associated windshield of moisture, motive means for driving said blades to and fro across the windshield, the inboard ends of the operating strokes of said blades overlapping one another, an expansible pneumatic link operatively connecting said blades for operating in unison and to park out of phase, a pneumatic system for expanding and contracting said link and control means, said last named means being adapted to simultaneously control the activation and deactivation of the motive means as well as the expansion and contraction of the expansible link.

9. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, a plurality of conduits interconnecting the first and second motors so as to insure the existence of substantially the same pressure conditions in the second motor as that prevailing in the first motor, a transmission including an expansible link operatively connected to said blades, the phase relationship of said blades being determined by whether or not said link is being maintained in an expanded or contracted condition, and means for controlling the contracting and expanding of said link.

10. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, a plurality of conduits interconnecting the first and second motors so as to insure the existence of substantially the same pressure conditions in the second motor as that prevailing in the first motor, a transmission including an expansible pneumatic link operatively connected to said blades, the phase relationship of said blades being determined by whether or not said link is being maintained in an expanded or contracted condition, a pneumatic system for expanding and contracting said link, and means for controlling the pneumatic system.

11. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, the inboard ends of the operating strokes of said blades overlapping one another, a transmission including an expansible link operatively connected to said blades, the phase relationship of said blades being determined by whether or not said link is being maintained in an expanded or contracted condition, and means for controlling the contracting and expanding of said link.

12. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, the inboard ends of the operating strokes of said blades overlapping one another, a transmission including an expansible pneumatic link operatively connected to said blades, the phase relationship of said blades being determined by whether or not said link is being maintained in an expanded or contracted condition, a pneumatic system for expanding and contracting said link, and means for controlling the pneumatic system.

13. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, a plurality of conduits interconnecting the first and second motors so as to insure the existence of substantially the same pressure conditions in the second motor as that prevailing in the first motor, a transmission including an expansible link operatively connected to said blades, the phase relationship of said blades being determined by whether or not said link is being maintained in an expanded or contracted condition, and control means, said last named means being adapted to simultaneously control the activation and deactivation of the motors as well as the expansion and contraction of the expansible link.

14. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, a transmission including an expansible pneumatic link operatively connected to said blades, the phase relationship of said blades being determined by whether or not said link is being maintained in an expanded or contracted condition, a pneumatic system for expanding and contracting said link, and control means, said last named means being adapted to simultaneously control the activation and deactivation of the motors as well as the expansion and contraction of the expansible link.

15. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, a plurality of conduits interconnecting the first and second motors so as to insure the existence of substantially the same pressure conditions in the second motor as that prevailing in the first motor, the inboard ends of the operating strokes of the blades overlapping one another, a transmission including an expansible link operatively connected to said blades, the phase relationship of said blades being determined by whether or not said link is being maintained in an expanded or contracted condition, and control means, said last named means being adapted to simultaneously control the activation and deactivation of the first and second motors as well as the expansion and contraction of the expansible link.

16. A windshield cleaning system for automotive vehicles comprising, a plurality of blades adapted to clear an associated windshield of moisture, a first motor for driving at least one of said blades to and fro across the windshield, a second motor for driving another of said blades to and fro across the windshield, the inboard ends of the operating strokes of said blades overlapping one another, a transmission including an expansible pneumatic link operatively connected to said blades, the phase relationship of said blades being determined by whether or not said link is being maintained in an expanded or contracted condition, a pneumatic system for expanding and contracting said link, and control means, said last named means being adapted to simultaneously control the activation and deactivation of the first and second motors as well as the expansion and contracting of the expansible link.

References Cited in the file of this patent
UNITED STATES PATENTS

| | | |
|---|---|---|
| 2,263,053 | Schuler | Nov. 18, 1941 |
| 2,287,179 | Kocher | June 23, 1942 |
| 2,683,353 | O'Shei | July 13, 1954 |